US012718113B2

(12) United States Patent
Phan et al.

(10) Patent No.: US 12,718,113 B2
(45) Date of Patent: Aug. 25, 2026

(54) BOOSTING CLASSIFICATION AND REGRESSION TREE PERFORMANCE WITH DIMENSION REDUCTION

(71) Applicant: International Business Machines Corporation, Armonk, NY (US)

(72) Inventors: Dzung Tien Phan, Pleasantville, NY (US); Michael Huang, Los Angeles, CA (US); Pavankumar Murali, Ardsley, NY (US); Lam Minh Nguyen, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 17/550,551

(22) Filed: Dec. 14, 2021

(65) Prior Publication Data

US 2023/0186107 A1 Jun. 15, 2023

(51) Int. Cl.
*G06N 5/01* (2023.01)
*G06F 18/214* (2023.01)

(52) U.S. Cl.
CPC ........... *G06N 5/01* (2023.01); *G06F 18/2148* (2023.01)

(58) Field of Classification Search
CPC . G06N 5/01; G06N 20/00; G06N 7/01; G06F 18/2148; G06F 18/24323
See application file for complete search history.

(56) References Cited

U.S. PATENT DOCUMENTS 5,909,681 A * 6/1999 Passera .................. G06F 18/23
6,385,607 B1 5/2002 Iyengar
9,324,040 B2 4/2016 Kimmel et al.
10,095,682 B2 10/2018 Polega et al.
2004/0199484 A1 10/2004 Smith et al.
2008/0118124 A1 5/2008 Madabhushi et al.
(Continued)

FOREIGN PATENT DOCUMENTS

CN 111259933 A 6/2020
CN 112633937 A 4/2021
(Continued)

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.
(Continued)

*Primary Examiner* — Kamran Afshar

(74) *Attorney, Agent, or Firm* — Scully, Scott, Murphy & Presser, P.C.; Anthony M. Pallone

(57) ABSTRACT

A system and method can be provided for constructing and training a decision tree for machine learning. A training set can be received. The decision tree can be initialized by constructing a root node and a root solver can be trained with the training set. A processor can grow the decision tree by iteratively splitting nodes of the decision tree, where at a node of the decision tree, dimension reduction is performed on features of data of the training set received at the node, and the data having reduced dimension is split based on a routing function, for routing to another node of the decision tree. The dimension reduction and the split can be performed together at the node based on solving a nonlinear optimization problem.

20 Claims, 8 Drawing Sheets

(56) References Cited

U.S. PATENT DOCUMENTS

| | | | | |
|---|---|---|---|---|
| 2012/0166366 | A1* | 6/2012 | Zhou | G06N 20/00 706/59 |
| 2017/0004455 | A1 | 1/2017 | Tang et al. | |
| 2018/0276564 | A1* | 9/2018 | Varma | G06N 5/04 |
| 2018/0322958 | A1* | 11/2018 | Kalafatis | G06N 5/041 |
| 2019/0073566 | A1 | 3/2019 | Brauer | |
| 2021/0150372 | A1 | 5/2021 | Jiang et al. | |
| 2021/0374518 | A1 | 12/2021 | Zhu et al. | |
| 2021/0374612 | A1* | 12/2021 | Yu | G06N 3/006 |
| 2021/0390778 | A1 | 12/2021 | Kim et al. | |
| 2022/0222931 | A1* | 7/2022 | Goyal | G06V 10/817 |
| 2022/0318641 | A1* | 10/2022 | Carreira-Perpiñán | G06N 20/20 |
| 2023/0186106 | A1* | 6/2023 | Valdes | G06N 5/01 706/46 |

FOREIGN PATENT DOCUMENTS

| | | | |
|---|---|---|---|
| CN | 113722908 | A | 11/2021 |
| CN | 113743574 | A | 12/2021 |
| CN | 113781617 | A | 12/2021 |
| CN | 116263813 | A | 6/2023 |
| JP | 2023-088289 | A | 6/2023 |
| TW | 201717070 | A | 5/2017 |
| TW | 201920944 | A | 6/2019 |
| TW | I844931 | B | 6/2024 |
| WO | 2020/244771 | A1 | 12/2020 |
| WO | 2020/247949 | A1 | 12/2020 |

OTHER PUBLICATIONS

Bala, M., et al., “Optimal Decision Tree Based Multi-class Support Vector Machine”, Informatica (2011), Received Aug. 5, 2010, pp. 197-209, vol. 35.

Breiman et al., “Classification and Regression Trees”, 1st Edition, 1984, 31 pages.

Li, “Dimension reduction for high dimensional data”, Statistical methods in molecular biology, Jan. 2010, pp. 417-434.

Japan Patent Office, “Notice of Reasons for Refusal” Feb. 24, 2026, 10 Pages, JP Application No. 2022-194939.

Notice of Allowance dated Feb. 22, 2024 received in Taiwan Application No. 111132814, 8 pages.

Aghaei, S., et al., “Learning Optimal and Fair Decision Trees for Non-Discriminative Decision-Making”, arXiv:1903.10598v1, Mar. 25, 2019, 9 pages.

Bertsimas, D., et al., “Optimal classification trees”, Machine Learning, Jul. 2017, pp. 1039-1082, vol. 106, No. 7.

Gunluk, O., et al., “Optimal Decision Trees for Categorical Data via Integer Programming”, Aug. 13, 2019, 27 pages.

Hehn, T.M., et al., “End-to-End Learning of Decision Trees and Forests”, International Journal of Computer Vision, Received Mar. 6, 2019, Accepted Sep. 17, 2019, Published online Oct. 9, 2019, 15 pages.

Kontschieder, P., et al., “Deep Neural Decision Forests”, 2015 IEEE International Conference on Computer Vision (ICCV), Published Dec. 7, 2015, pp. 1467-1475.

Tanno, R., et al., “Adaptive Neural Trees”, arXiv:1807.06699v4, Feb. 13, 2019, 15 pages.

Verwer, S., et al., “Learning Optimal Classification Trees Using a Binary Linear Program Formulation”, The Thirty-Third AAAI Conference on Artificial Intelligence (AAAI-19), Nov. 2018, pp. 1625-1632.

Yang, B.-B., et al., “Weighted Oblique Decision Trees”, The Thirty-Third AAAI Conference on Artificial Intelligence (AAAI-19), Jul. 2019, pp. 5621-5627.

Zhu, H., et a., “A Scalable MIP-based Method for Learning Optimal Multivariate Decision Trees”, 34th Conference on Neural Information Processing Systems (NeurIPS 2020), Nov. 2020, 22 pages.

* cited by examiner

BOOSTING CLASSIFICATION AND REGRESSION TREE PERFORMANCE WITH DIMENSION REDUCTION

BACKGROUND

The present application relates generally to computers and computer applications, and more particularly to machine learning, creating and training classification and regression trees with dimension reduction techniques.

Decision trees are a popular class of machine learning models known for their computational attractiveness and their strong performance in a variety of applications. They function by learning hierarchical clusters of data generated by recursively splitting data. While popular, the most basic methods such as a Classification and Regression Tree (CART) rely on greedy criterion or heuristics to generate the splits and thus potentially sacrifice the optimality of the splitting for lower computational cost.

BRIEF SUMMARY

The summary of the disclosure is given to aid understanding of a computer system and method of an end-to-end system for boosting classification and regression tree performance, for example, with dimension reduction techniques, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method of constructing a decision tree in machine learning, in one aspect, can include receiving a training set. The method can also include initializing the decision tree by constructing a root node and training a root solver with the training set. The method can also include growing the decision tree by iteratively splitting nodes of the decision tree, where at a node of the decision tree, dimension reduction is performed on features of data of the training set received at the node, and the data having reduced dimension is split based on optimizing a routing function, for routing to another node of the decision tree, where the dimension reduction and the split is performed together at the node, where the decision tree includes routing nodes and leaf nodes. The method can also include performing training for routing functions at the routing nodes, solvers at the leaf nodes, and dimension reduction at every node of the decision tree simultaneously by an optimization algorithm.

A system, in an aspect, can include a processor and a memory device coupled with the processor. The processor can be configured receive a training set. The processor can also be configured to initialize the decision tree by constructing a root node and training a root solver with the training set. The processor can also be configured to grow the decision tree by iteratively splitting nodes of the decision tree, where at a node of the decision tree, dimension reduction is performed on features of data of the training set received at the node, and the data having reduced dimension is split based on optimizing a routing function, for routing to another node of the decision tree, where the dimension reduction and the split is performed together at the node, where the decision includes routing nodes and leaf nodes. The processor can also be configured to perform training for routing functions at the routing nodes, solvers at the leaf nodes, and dimension reduction at every node of the decision tree simultaneously by an optimization algorithm.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
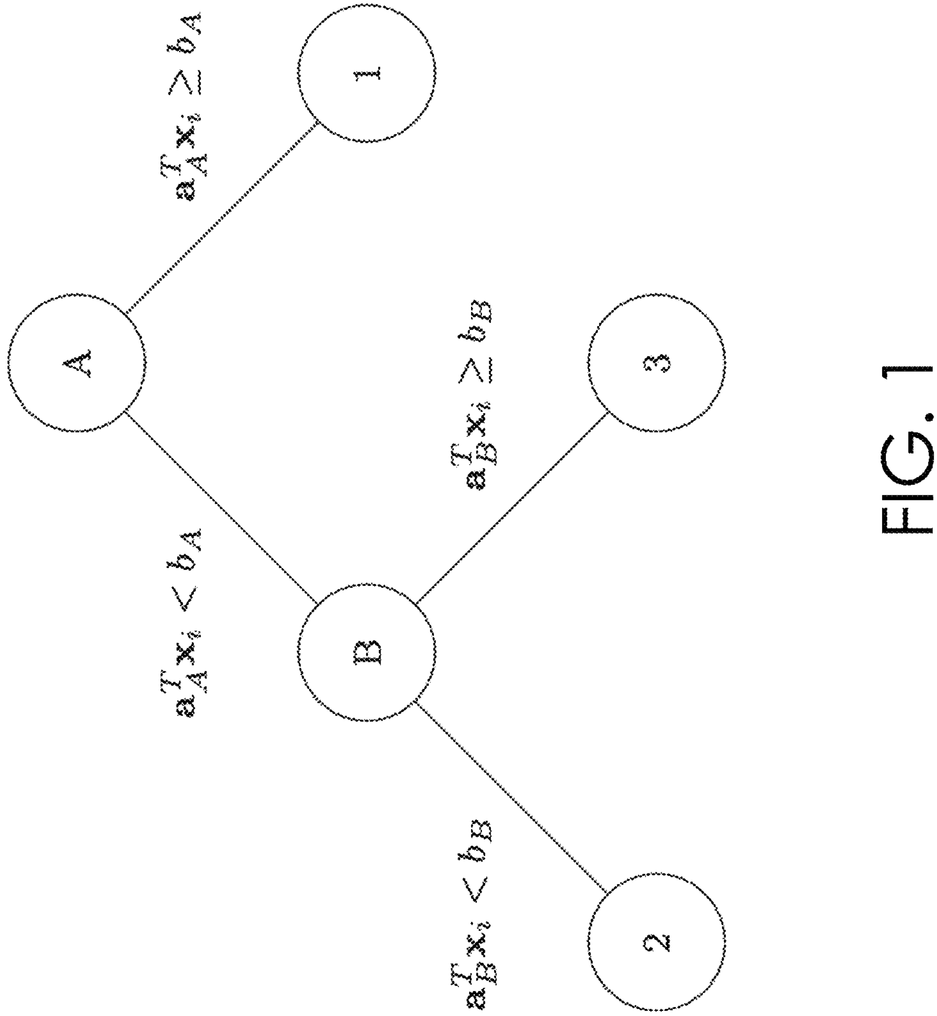
FIG. 1 shows a decision tree learning in an embodiment.

An end-to-end tree learning framework can be provided. In an embodiment, the framework can use nonlinear programming techniques and can work in data settings such as where there can be high-dimensional multi-modal tabular data that can include large number of features and samples. For example, the framework can be a nonlinear program decision tree framework. In an aspect, the framework unifies dimension reduction and training process, for example, integrates dimension reduction in the training or learning process of a decision tree. In an aspect, dimension reduction improves out of sample performance for tree-based supervised learning models. The framework also may implement regularizers to improve its performance. The framework can be applicable for classification and regression tasks, e.g., with imbalanced datasets and nonlinear accuracy metrics. The framework can also provide scalable approach with distributed training. In an embodiment, the framework can employ a method for hierarchical clustering of data. In an embodiment, branching rule can be based on a probabilistic model, and the framework can be aware of downstream learning models. The models can be trained by a scalable variance-reduction stochastic gradient algorithm. In an embodiment, the framework may use in-the-loop dimension reduction of feature data and/or principal component analysis (PCA)-like structure with nonlinear regularizers.

Decision trees are learning models used in regression and classification. In one or more embodiments, systems and/or methods can be presented, which can construct an end-to-end learning scheme that incorporates dimension reduction into tree construction. For example, applying or integrating dimension reduction to decision tree learning may allow the systems and/or methods to computationally scale optimal classification and regression tree framework. Identifying a proper dimension reduction may additionally boost performance of decision tree learning.

Decision trees disclosed herein can be implemented, constructed and trained on or by one or more computer processors, for example, including one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

FIG. 1 shows a decision tree in an embodiment. By way of example, a data can be represented as:

$$\{(x_i, Y_i)\}_{i=1}^{N},$$

where $Y_i \in \mathbb{R}$ for regression and $Y_i \in \{1, \ldots, C\}$ for classification, where $Y_i$ represent the labels (or label to be predicted) and $x_i$ represents features. A decision tree can include a root note (e.g., node A), branching nodes (e.g., node B), and leaf nodes (e.g., nodes 1, 2, 3). The data can be split to different leaf nodes via branching nodes, depending on the values of the features. A data point can be sent a left node or right node, depending on where the data fits. For example, in splits, data in a decision tree are routed via splits that have the form, for node n: Data point $x_i$ is routed left if $f_n(x_i)<b_n$; and Data point $x_i$ is routed right if $f_n(x_i)\geq b_n$; for some branch rule function $f_n(x_i)$. For instance, each split can be generated from the data to fit the data. In an embodiment, dimension reduction such as principal component analysis (PCA) can be performed on the data routed to a branching node or root node in the decision tree. Applying a dimension reduction to find reduced number of features with the model fitting at a node, e.g., at each split, can boost learning performance of a decision tree. For example, dimension reduction can be performed on a cluster of data sent to a node. In an aspect, performing a dimension reduction on a specific cluster of data sent to a node can accommodate data setting where there can be multi-modal types of data. For example, performing a dimension reduction on individual clusters can identify the multi-modal nature of the data, where one cluster at a node can have a different set of features from another cluster at another node in their model fittings.

Figure 2:
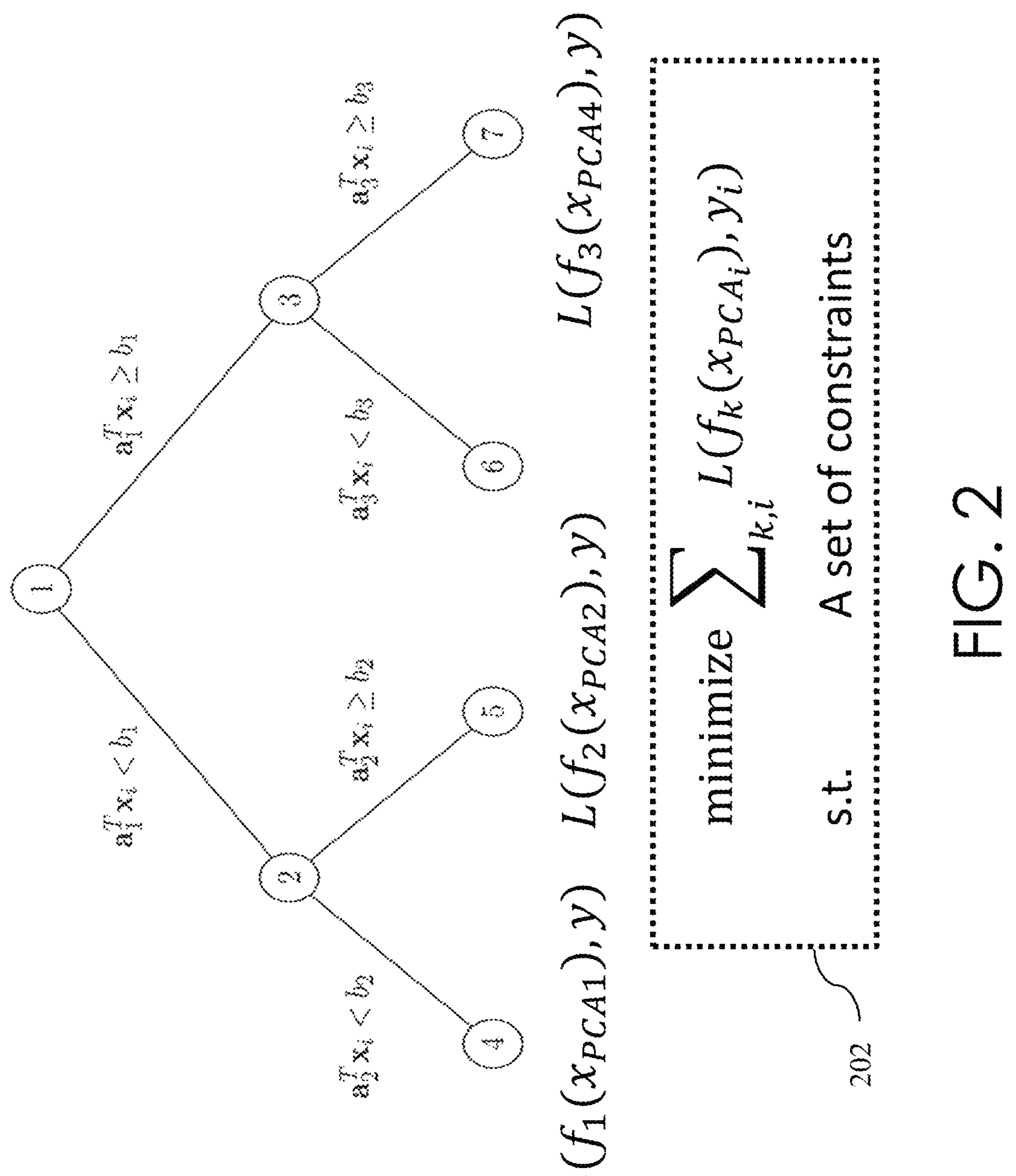
FIG. 2 is another diagram illustrating dimension reduction and decision tree training or learning in an embodiment.

FIG. 2 is another diagram illustrating dimension reduction and decision tree training or learning in an embodiment. An end-to-end method in an embodiment combines dimension reduction (e.g., PCAs) and learning optimal decision tree into a unified model. For example, the optimizations of dimension reduction and of learning a prediction model (e.g., minimizing the training loss, e.g., in a machine learning model), can be performed at the same time at every node (e.g., leaf nodes and intermediary nodes), or at once, e.g., by performing an optimization shown at 202: minimize $\Sigma_{k,i} L(f_k(x_{PCA_i}), y_i)$ s.t. (such that) a set of constraints are met. Here $f_k(x)$ is the prediction model at the k-th leaf node. The set of constraints are configurable depending on the type of problem being solved. In an embodiment, regularizers can be introduced to improve the performance of tree learning framework.

In an embodiment, the nonlinear program decision tree framework can be specialized for high-dimensional multimodal tabular data, where there can be many features and samples, can unify dimension reduction and training process, can be applicable for classification and regression tasks with imbalanced datasets and nonlinear accuracy metrics, and can form a scalable approach with distributed training.

Figure 3:
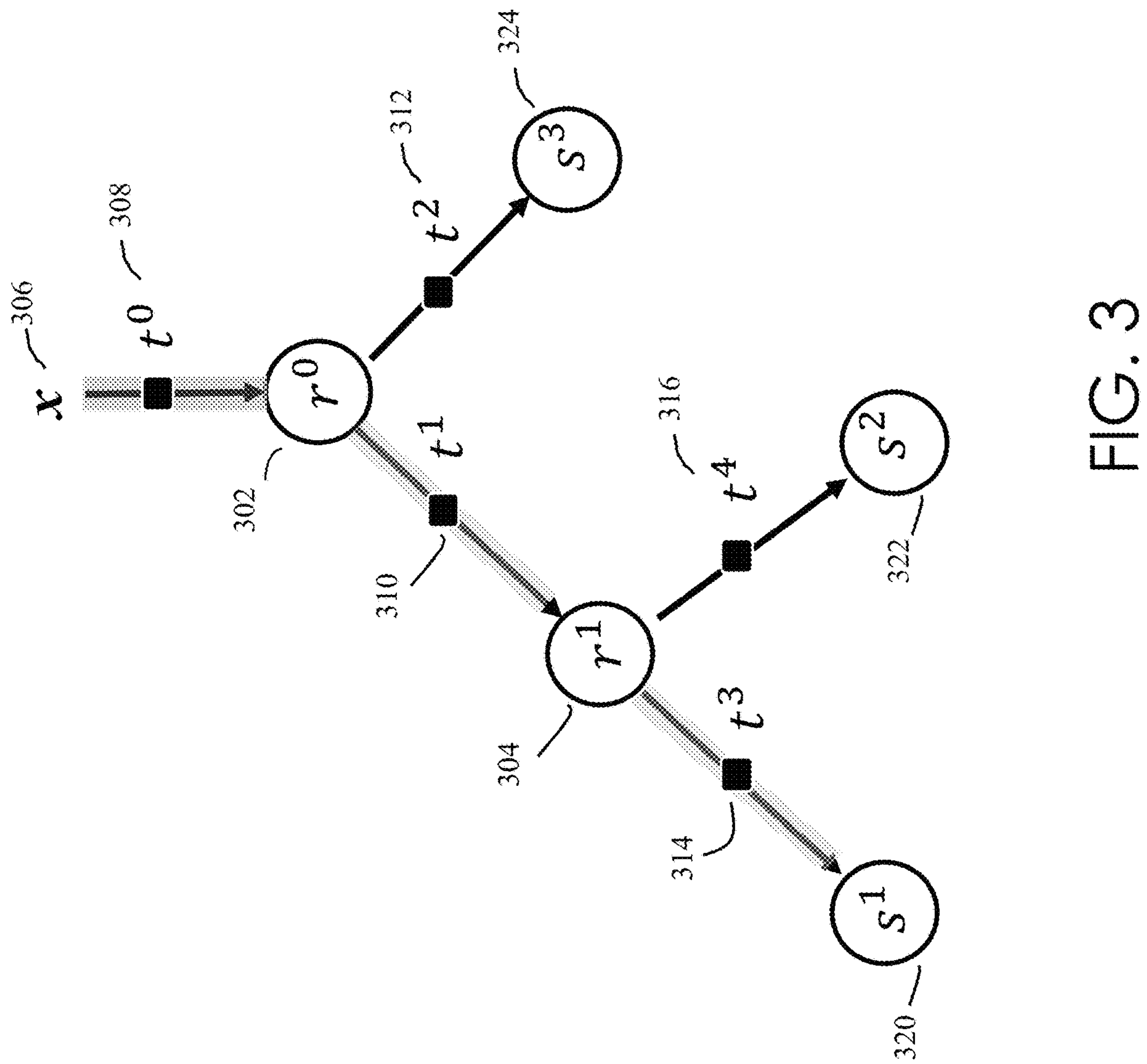
FIG. 3 is another diagram illustrating a general decision tree framework in an embodiment.

FIG. 3 is another diagram illustrating a general decision tree framework in an embodiment. In an aspect, decision trees can have three components: Router: $r^i$ nodes, routes data left or right; Transformer: $t^i$ nodes, transforms data into new representation in a low dimensional space; Solver: $s^i$ inodes, returns prediction given data routed to the respective leaf node. Routers (e.g., 302, 304) send or split the data (e.g., 306) from one node to another node. Transformers (e.g., 308, 310, 312, 314, 316) can apply dimension reduction to data. Solvers (e.g., 320, 322, 324) include models that are being fit to different clusters of data sent to the solvers. In an embodiment, each solver can be a different model at the leaf nodes of a decision tree.

In an embodiment, transformers can employ techniques such as PCAs. For example, PCA based dimension reduction framework can highlight impact of dimension reduction in learning. In an embodiment, splits and routing can be improved using regularization. Different regularization techniques can be employed. For example, in an embodiment, a single routing regularizer can encourage routing each observation to a single node. A single routing regularizer can improve learning in leaf node solvers and output a nearly deterministic decision tree. A single routing regularizer $$\left(\text{e.g., } -\gamma_2 \sum_{n=1}^{N} \sum_{\ell} \pi_\ell\left(x^{(n)}; \Theta\right)^2\right)$$

has concave penalty and encourages $\pi_\ell(x^{(n)}; \Theta)$ to be close to 0 or 1.

In another embodiment, a diversification regularizer $$\left(\text{e.g., } \gamma_1 \sum_{\ell} \left(\sum_{n=1}^{N} \pi_\ell\left(x^{(n)}; \Theta\right)\right)^2\right)$$

can encourage data to be routed evenly among leaf nodes, e.g., each leaf to receive an equal amount of observations. A diversification regularizer can have convex penalty. A diversification regularizer can artificially induce hierarchical clustering of observed data; allow a model to fit training data more optimally while still generalizing; and can allow for clustering while learning simultaneously. In another embodiment, an orthogonality regularizer $$\left(\lambda \left\| C_n^T C_n - I_m \right\|_F\right)$$

can encourage dimension reduction (e.g., transformers) to more closely resemble a PCA. For example, an orthogonality regularizer can have convex penalty and can preserve a PCA structure by enforcing orthogonality between columns of C.

In an embodiment, the decision tree learning framework integrates PCA-like projection into a routing function to be aware of downstream prediction models. A general learning setting can include data of N observations with p features: $(x^{(1)}, y^{(1)}), \ldots, (x^{(N)}, y^{(N)}) \in \mathcal{X} \times \mathcal{Y}$, e.g., for classification, C classes, or for regression, $\mathcal{Y} \in \mathbb{R}$.

In an embodiment, the framework integrates probabilistic decision trees, where the router splits the data based on the transformed data in the lower dimensional space. For example, to incorporate the projection structure into the learning scheme of decision trees, the framework may include probabilistic decision trees or soft decision trees. In an embodiment, these trees route $x_i$ left and right with some probability. Function determining probability can be differentiable. Specifically, for example, node n routes left with probability:

$$\sigma_n(f_n(x_i)) = \frac{1}{\left(1 + e^{-f_n(x_i)}\right)}.$$

As shown in FIG. 3, in an embodiment, components of a learning decision tree can include router nodes 302, 304 and solver nodes 320, 322, 324. In an embodiment, a router node routes each observation $x^{(i)}$ to the left child with probability p and to the right child with probability 1−p. In an embodiment, a router may apply linear dimension reduction layer to features before routing. In an embodiment, a solver node at a leaf node of tree returns predicted target $\hat{y}^{(i)}$. Solver nodes can be general learning models like linear regression, kernel regression, and/or others, formally, $s_\ell(y; x, \Delta_\ell)$ for classification and $s_\ell(x; \Delta_\ell)$ for regression parameterized by $\Delta_\ell$.

In an embodiment, transformers 308, 310, 312, 314, 316 appear on the arcs between nodes for dimension reduction. Routers 302, 304 which appear in non-leaf nodes (e.g., branching nodes) split the data. Solvers 320, 322, 324, which appear in leaf nodes generate an estimate for the output. The framework can be a specialized model based on dimension reduction, which can work for high-dimensional data-sets. The framework learns $\mathbb{P}(y|x)$ for the classification setting and $\mathbb{E}[y|x]$ for the regression setting given N labelled samples $(x^{(1)}, y^{(1)}), \ldots, (x^{(N)}, y^{(N)}) \in \mathcal{X} \times \mathcal{Y}$ as training data where $\mathcal{X} \in \mathbb{R}$, $\mathcal{Y} \in \mathbb{R}$ for the regression setting, and $\mathcal{Y} \in \{1, \ldots, C\}$ for the classification setting.

In an embodiment, the routing function for the $n^{th}$ node can be defined as $r_n(x; \Theta_n)$ which indicates the probability that datapoint x is routed to the left child node. The routing function can be parameterized by $\Theta_n$. In an embodiment, the routing function can be chosen to be $$r_n(x; \Theta_n) = \sigma\left(x^T C_n \theta_n\right)$$

where $C_n \in \mathbb{R}^{p \times m}$, $\theta_n \in \mathbb{R}^{m \times 1}$, and $\sigma(z) = 1/(1+e^{-z})$ is the sigmoid function. Here, p represents the dimension of the feature space, e.g., number of features for sample x as in $\mathbb{R}^p$; m represents the dimension for the new lower dimension feature space. A method disclosed herein in an embodiment projects x in $\mathbb{R}^p$ to a lower dimensional space, e.g., in $\mathbb{R}^m$. Hence m is a tunable parameter. One can view $C_n$ as the projection of x to a lower dimensional setting, e.g., in $\mathbb{R}^m$, and $\theta_n$ as the split parameters for the lower projection of x. For example, the matrix $C_n$ is used for dimension reduction.

In an embodiment, the solver function for the $\ell^{th}$ leaf node can be defined as $s_\ell(y; x, \Delta_\ell)$ for classification which returns an estimate for $\mathbb{P}(y|x)$. In an embodiment, for regression, the solver function can be defined as $s_\ell(x, \Delta_\ell)$, which returns an estimate for $\mathbb{E}[y|x]$. The solver function can be parameterized by $\Delta s_\ell$. For classification, the framework can set the solver to be multinomial logit model or a constant. For regression, the solver can be a linear function such as $s_\ell(x; \boldsymbol{\beta}_\ell) = x^T \boldsymbol{\beta}_\ell$ where $\boldsymbol{\beta}_\ell \in \mathbb{R}^p$. In an embodiment, a dimension reduction for a solver can be a function of $x^T C_n$. For example, for linear regression solver $s_\ell(x; \boldsymbol{\beta}_\ell) = x^T C_n B \boldsymbol{\beta}_\ell$.

To performance inference and generate an estimate $\mathbb{P}(y|x; \Theta, \Delta)$ or $\mathbb{E}(y|x; \Theta, \Delta)$ for x, using the model, the framework can define $\mathcal{L}_\ell$ and $\mathcal{R}_\ell$, which are the sets of nodes that route x left and right, respectively, to reach leaf node $\ell$. In can be observed that $$\mathbb{P}(y \mid x; \Theta, \Delta) = \Sigma_\ell\left(s_\ell(y; x, \Delta_\ell)\left[\prod_{n \in \mathcal{L}\ell} r_n(x; \Theta_n)\right]\left[\prod_{n \in \mathcal{R}\ell}(1 - r_n(x; \Theta_n))\right]\right)$$

and $$\mathbb{E}(y \mid x; \Theta, \Delta) = \Sigma_\ell\left(s_\ell(x; \Delta_\ell)\left[\prod_{n \in \mathcal{L}\ell} r_n(x; \Theta_n)\right]\left[\prod_{n \in \mathcal{R}\ell}(1 - r_n(x; \Theta_n))\right]\right).$$

In an embodiment, for a classification problem, the framework may utilize the negative log-likelihood (NLL) as the objective function to minimize for training the decision tree:

$$-\log\mathbb{P}(Y \mid X; \Theta, \Delta) = -\sum_{n=1}^{N} \log\mathbb{P}\left(y^{(n)} \mid x^{(n)}; \Theta, \Delta\right)$$

In an embodiment, the framework can also add regularizers into the objective function. By way of example, for PCA like projections for $C_n$, the columns of the matrix $C_n$ can be made orthogonal. A way to enforce this constraint can be to introduce the regularizer $$\lambda\left\|C_n^T C_n - I_m\right\|_F$$

where $I_m$ is a m×m identity matrix. In an embodiment, to mitigate overfitting and to promote diversity, the framework can add a regularizer to reduce the number of data points that are routed to one node. To define the regularizer, the framework can define $$\pi_\ell(x; \Theta) = \left[\prod_{n \in \mathcal{L}\ell} r_n(x; \Theta_n)\right]\left[\prod_{n \in \mathcal{R}\ell}(1 - r_n(x; \Theta_n))\right]$$

which is the probability that data point x is routed to leaf node $\ell$. The regularization term is thus $$\gamma \sum_{n=1}^{N} \sum_\ell \pi_\ell\left(x^{(n)}; \Theta\right)^2.$$

This is a penalty term as it becomes larger when a data point is only routed to one leaf node. The complete optimization problem for training becomes $$\min_{\Theta,\Delta} -\log\mathbb{P}(Y \mid X; \Theta, \Delta) + \lambda\|C_n^T C_n - I_m\|_F + \gamma\sum_{n=1}^{N}\sum_{\ell}\pi_\ell(x^{(n)}; \Theta)^2. \quad (1)$$

The process solving this optimization problem is called training the decision tree. After solving the optimization problem (1), the model parameters $\Theta_n$ for the routers $r_n(x; \Theta_n)$ and $\Delta_\ell$ for solvers $s_\ell(y; x, \Delta_\ell)$ can be obtained.

For a regression problem, the framework may minimize the squared loss:

$$\sum_{n=1}^{N}\left[y^{(n)} - \mathbb{E}(y \mid x^{(n)}; \Theta, \Delta)\right]^2.$$

Applying the same regularizers the complete optimization problem for training becomes $$\min_{\Theta,\Delta}\sum_{n=1}^{N}\left[y^{(n)} - \mathbb{E}(y \mid x^{(n)}; \Theta, \Delta)\right]^2 + \lambda\|C_n^T C_n - I_m\|_F + \gamma\sum_{n=1}^{N}\sum_{\ell}\left|\pi_\ell(x^{(n)}; \Theta) - \epsilon\right|. \quad (2)$$

$$\min_{\Theta,\Delta}\sum_{n=1}^{N}\left[y^{(n)} - \mathbb{E}(y \mid x^{(n)}; \Theta, \Delta)\right]^2 + \lambda\|C_n^T C_n - I_m\|_F + \gamma_1\sum_{n=1}^{N}\left(\sum_{\ell}\pi_\ell(x^{(n)}; \Theta)\right)^2 - \gamma_2\sum_{n=1}^{N}\sum_{\ell}\pi_\ell(x^{(n)}; \Theta)^2. \quad (3)$$

$$\min_{\Theta,\Delta}\sum_{n=1}^{N}\left[y^{(n)} - \mathbb{E}(y \mid x^{(n)}; \Theta, \Delta)\right]^2 + \lambda\|C_n^T C_n - I_m\|_F + \lambda\sum_{n=1}^{N}\left(\sum_{\ell}\pi_\ell(x^{(n)}; \Theta)\right)^2 - \gamma\sum_{n=1}^{N}\sum_{\ell}\left(\pi_\ell(x^{(n)}; \Theta) - 0.5\right)^2. \quad (4)$$

After solving the optimization problem (1), the model parameters $\Theta_n$ for the routers $r_n(x; \Theta_n)$ and $\Delta_\ell$ for solvers $s_\ell(x, \Delta_\ell)$ can be obtained.

An embodiment of constructing a decision tree can use a greedy method that iteratively splits leaf nodes in a breadth-first search manner until new splits do not improve the prediction error. In another embodiment, a decision tree can be constructed with a predetermined topology. In an embodiment, tree construction can include initialization, growth phase and fine-tuning phase. In the initialization stage, the framework can divide training data into a training set and a validation set. The framework can initialize the tree by constructing the root node 0 and training the solver $s_0(\Delta_0)$ (e.g., referred to as a root solver) with the training set. Once $s_0(\Delta_0)$ is trained, the framework fixes the root solver until the fine-tuning phase.

In the growth phase, in an embodiment that uses a predetermined topology, the framework iteratively splits leaf nodes until the framework obtains the predetermined topology of the tree. Predetermined topology fixes the tree structure, for example, fixes the depth of the tree. For example, for each layer, the framework may assign one solver to be the original root node solver; to split, the framework may train two new solvers with a random subset of training data and fit router to optimize split; the framework may optimize routing functions. The training process is done locally for the newly added router and solvers while fixing the model parameters of other parts of the tree. For instance, for the split of leaf node $\ell$, the framework may fit the solver of the right child with a random subset of the training data and set the solver of the left child to be $s_0(\Delta_0)$. The framework may then locally optimize routing function $r_\ell(x; \Theta_\ell)$ by holding all other parameters in $\Theta$ and $\Delta$ fixed. For example, the routing function can be $r_\ell(x; \Theta_\ell)=1/(1+e^{-x^T C_n \theta_n})$ where $C_n \in \mathbb{R}^{p\times m}$ and $\theta_n \in \mathbb{R}^{m\times 1}$. In an aspect, the routing function is defined at the root node or intermediary nodes. A solver is a prediction model at a leaf node. They are combined in a unified optimization problem (e.g., Problem (1) or (4)) for training the decision tree. In an aspect, dimension reduction can occur in both a router and a solver.

In an embodiment, in the fine-tuning phase, the framework may globally fit every solver (e.g., at leaf nodes) and routing parameters using stochastic gradient descent (SGD); the framework may refit classifier for each leaf node using base classifier algorithms. For instance, once the growth phase is done, the framework may globally optimize the tree by solving Problem or Eq. (1) for the classification setting and Problem or Eq. (4) for the regression setting. The framework may solve the respective problems using stochastic gradient descent type methods such as Adam algorithm.

In an embodiment, additional refinements can be performed, for instance, at the end of the fine-tuning phase. For example, the leaf nodes can be refit on the routed data to minimize training error. To refit the data using the routed data, one can minimize a weighted version of linear regression. Specifically for example, for each leaf node $\ell$, the framework may minimize $$\min_{\Delta_\ell}\sum_{n=1}^{N}\pi_\ell(x^{(n)}; \Theta)\left[y^{(n)} - s_\ell(x^{(n)}, \Delta_\ell)\right]^2.$$

In another embodiment, the framework may apply one or more preprocessing and/or unsupervised learning, which may improve performance for learning methods. For example, good performance can be achieved by filtering out low variance features, standardizing features, and applying PCA. For instance, applying such preprocessing can decrease training error.

Experiments performed indicate that the methodology of the framework disclosed herein improves training accuracy and test accuracy over conventional decision tree training techniques, which do not include feature reduction. For example, training data of 4020 samples and test data of 4020 samples having 200 features were used in an experiment. The number of features in each trial were reduced by feature reduction factors. It is observed that performance increases with fewer number of features.

Figure 4:
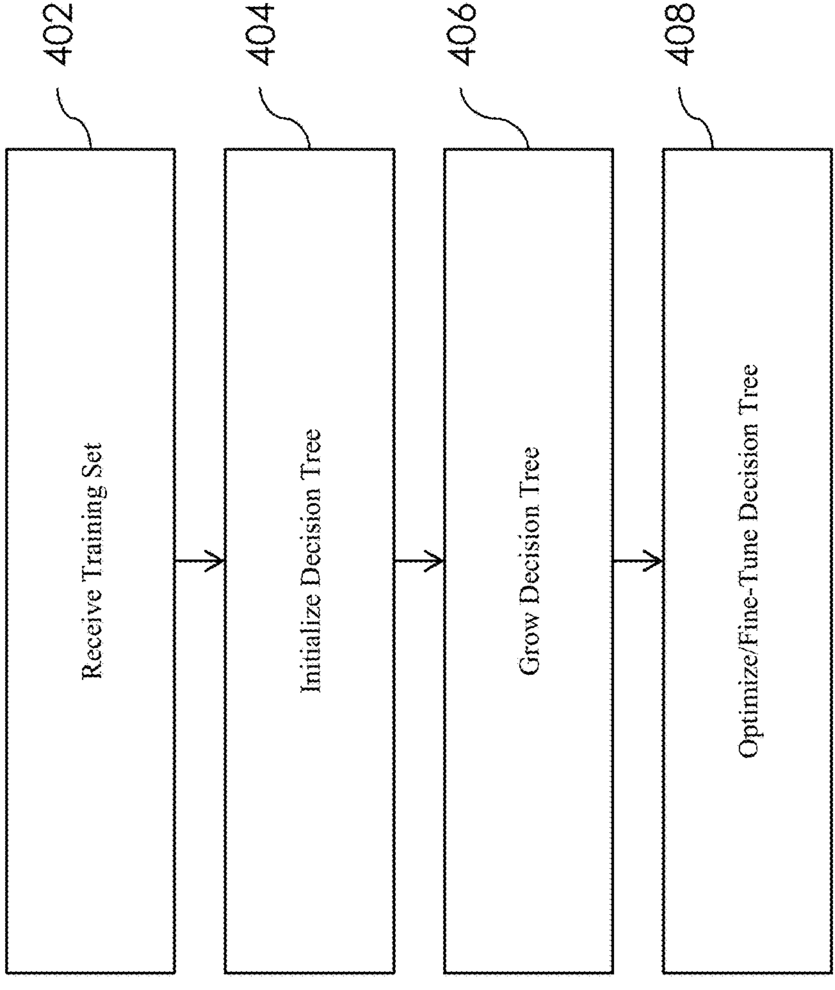
FIG. 4 is a flow diagram illustrating a method in an embodiment of constructing and learning a decision tree.

FIG. 4 is a flow diagram illustrating a method in an embodiment of constructing and learning a decision tree. The method can be implemented or run on one or more computer processors, for example, including one or more hardware processors. A decision tree learns a sequence of questions with each question involving a feature and a split point. At 402, a training set can be received. At 404, the decision tree can be initialized by constructing a root node and training a root solver with the training set. At 406, the decision tree can be grown by iteratively splitting nodes of the decision tree. For example, at a node of the decision tree, dimension reduction can be performed on features of data of the training set received at the node, and the data having reduced dimension can be split based on optimizing a routing function, for routing to another node of the decision tree. For example, the dimension reduction and the split is performed together at the node. At 408, the decision tree can be optimized, for exmaple, fine-tuned. The decision tree can include routing nodes and leaf nodes, and the method can include performing training for routing functions at the routing nodes, solvers at the leaf nodes, and dimension reduction at every node of the decision tree at the same time or simultaneously by an optimization algorithm.

In an embodiment, a predetermined topology for the decision tree can also be received, where the nodes can be iteratively split until a predetermined topology is obtained. In an embodiment, the nodes of the decision tree can include at least routing nodes and leaf nodes, where the dimension reduction can be performed with optimization at each of the routing nodes and leaf nodes. In an embodiment leaf nodes of the decision tree can include solvers that return a predicted target value. In an embodiment, leaf nodes of the decision tree can include a regression model that returns a predicted target value. In an embodiment, the decision tree can be optimized using a regularizer such as an orthogonality regularizer, a diversification regularizer, and/or a single routing regularizer. In an embodiment, the decision tree can be trained to solve a regression problem. In an embodiment, the decision tree can be trained to solve a classification problem. In an embodiment, the training set can include imbalanced datasets (e.g., not necessarily evenly divided target values) and the model performance metrics can include nonlinear accuracy metrics. For example, nonlinear metrics may include F1-score, Matthews correlation coefficient, and Fowlkes-Mallows index.

In an aspect, integrating PCA and decision tree into a unified framework, and for example, using one or more of the regularizers disclosed here, for end-to-end training, help to improve prediction accuracy. Using a distributed algorithm for solving Problems (1) and (4) such as stochastic gradient descent can reduce training time. In an aspect, the unified framework can be used in both classification and regression problems.

Figure 5:
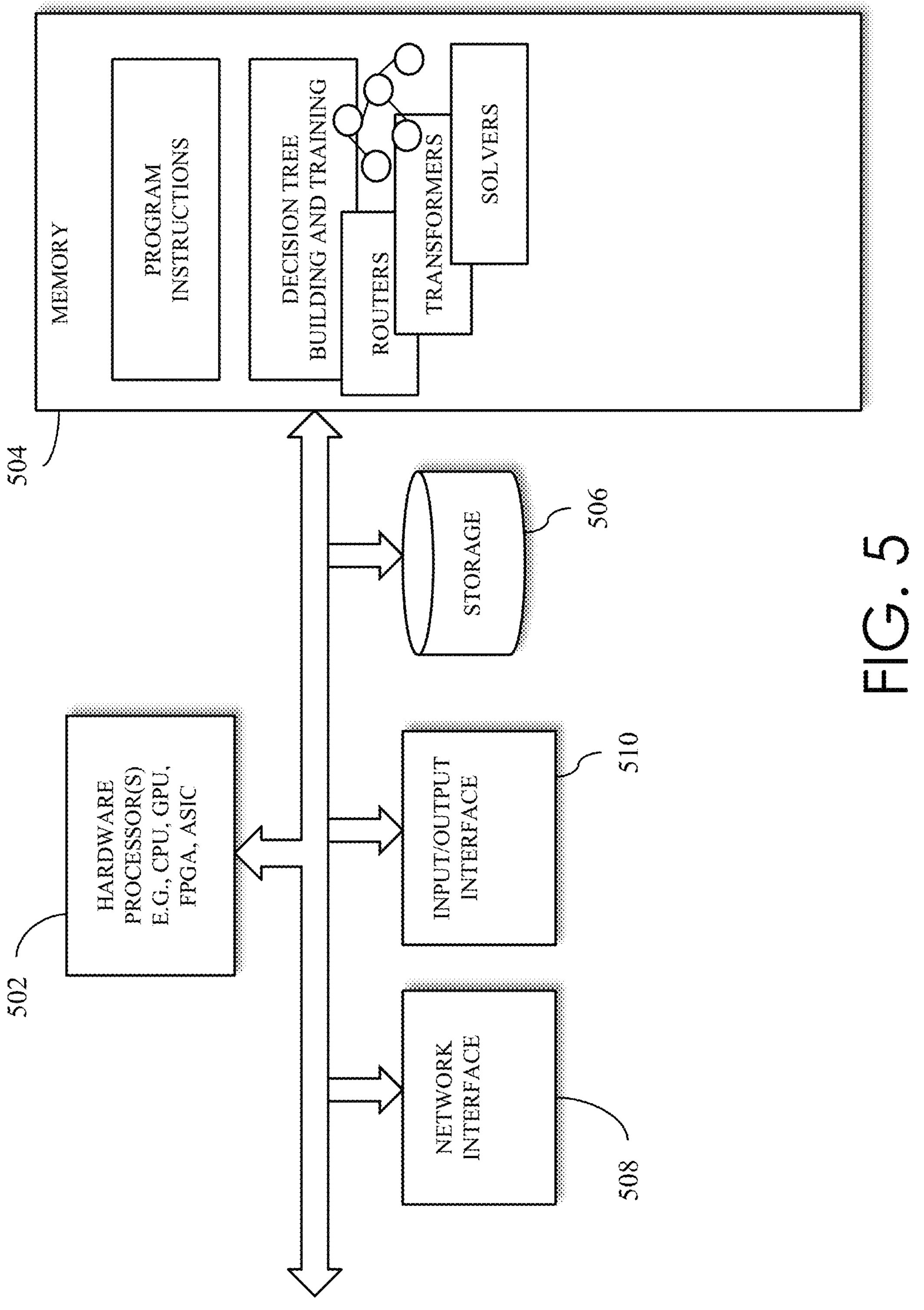
FIG. 5 is a diagram showing components of a system in one embodiment that can construct and train a decision tree in machine learning

FIG. 5 is a diagram showing components of a system in one embodiment that can construct and train a decision tree in machine learning. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and generate and train a decision tree model based on a training set and make predictions or answer questions based on unseen data. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input including a training set. For instance, at least one hardware processor 502 may generate a decision tree model in machine learning. In one aspect, such training data may be stored in a storage device 506 or received via a network interface 508 from a remote device, and may be temporarily loaded into a memory device 504 for building or generating the decision tree model. The learned decision tree model may be stored on a memory device 504, for example, for running by one or more hardware processors 502. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
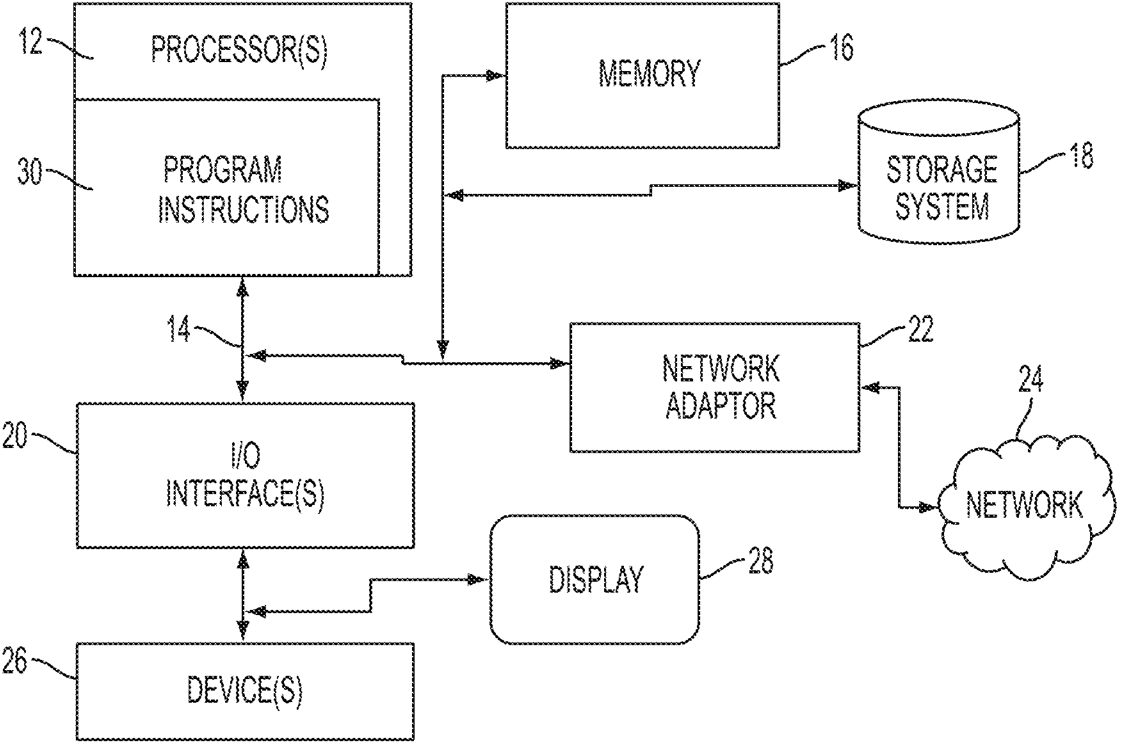
FIG. 6 illustrates a schematic of an example computer or processing system that may implement a system according to one embodiment.

FIG. 6 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage system 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
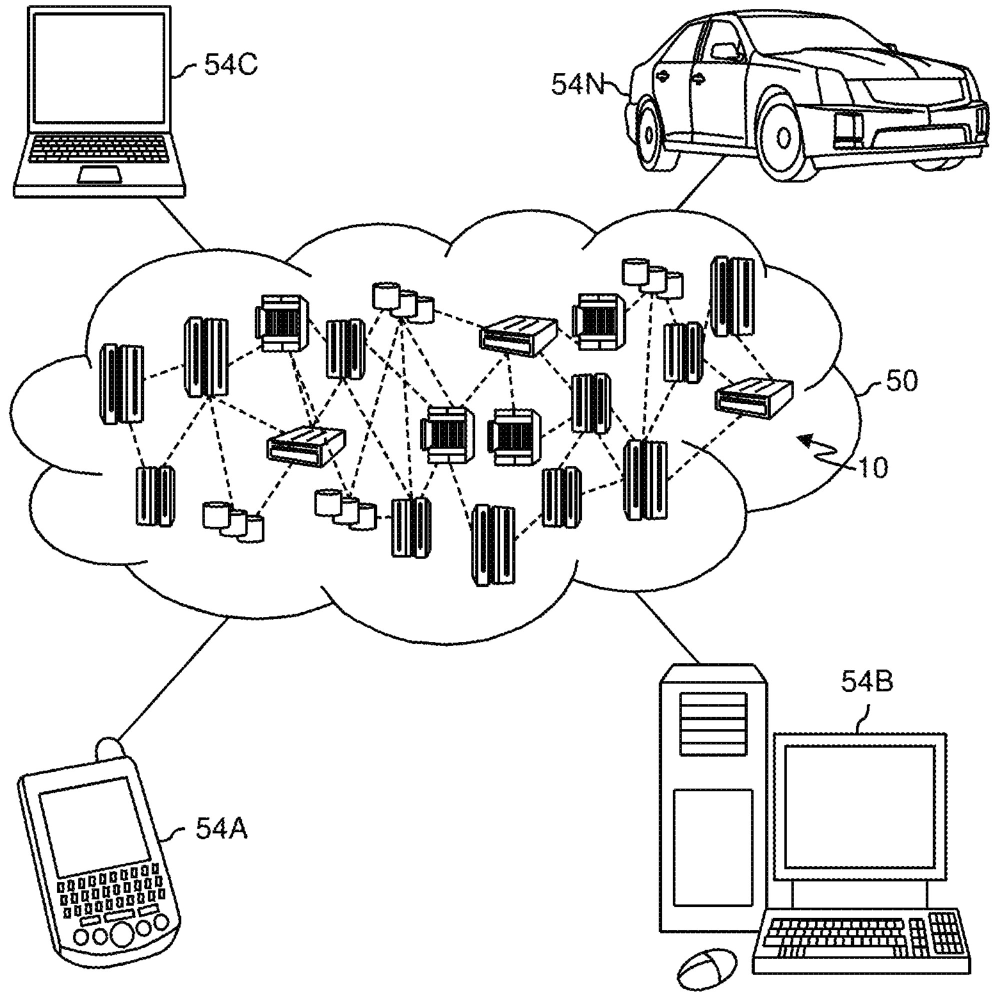
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
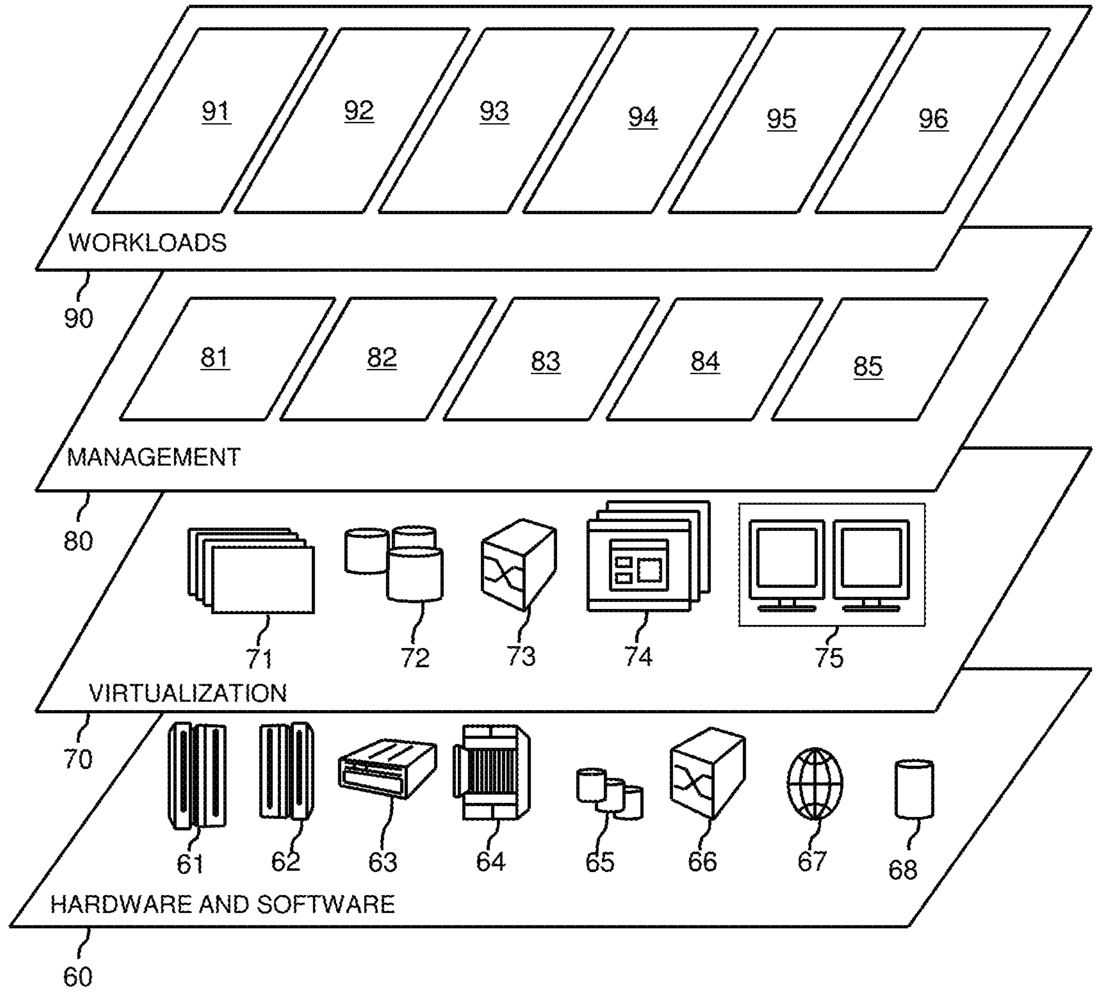
FIG. 8 illustrates a set of functional abstraction layers provided by cloud computing environment in one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and decision tree processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of constructing a decision tree in machine learning, comprising:

receiving a training set;

initializing the decision tree by constructing a root node and training a root solver with the training set;

growing the decision tree by iteratively splitting nodes of the decision tree, wherein at a node of the decision tree, dimension reduction is performed on features of data of the training set received at the node, and the data having reduced dimension is split based on a routing function, for routing to another node of the decision tree, wherein the dimension reduction and the split is performed together at the node, wherein the decision tree includes routing nodes and leaf nodes; and performing training for routing functions at the routing nodes, solvers at the leaf nodes, and dimension reduction at each of the routing nodes and leaf nodes of the decision tree simultaneously by a unified optimization algorithm that combines the routing functions at the routing nodes, solvers at the leaf nodes, and dimension reduction at each of the routing nodes and leaf nodes of the decision tree, simultaneously training obtaining model parameters for the routing nodes and solvers for the leaf nodes, the dimension reduction being performed on a cluster of data sent to each of the routing nodes, wherein a first cluster sent to a first routing node of the routing nodes has a different set of feature from a second cluster sent to a second routing node of the routing nodes, wherein, at each layer below the root node of the decision tree, a solver is assigned the trained root solver and at least two new solvers are trained with a random subset of the training set and fitted as the routing functions.

2. The method of claim 1, further including:

receiving a predetermined topology for the decision tree; and wherein the nodes are iteratively split until the predetermined topology is obtained.

3. The method of claim 1, wherein the leaf nodes of the decision tree include the solvers that return a predicted target value.

4. The computer-implemented method of claim 1, wherein the leaf nodes of the decision tree include a regression model that returns a predicted target value.

5. The computer-implemented method of claim 1, further including optimizing the decision tree using a regularizer.

6. The computer-implemented method of claim 5, wherein the regularizer includes an orthogonality regularizer.

7. The computer-implemented method of claim 5, wherein the regularizer includes a diversification regularizer.

8. The computer-implemented method of claim 5, wherein the regularizer includes a single routing regularizer.

9. The computer-implemented method of claim 1, wherein the decision tree is trained to solve a regression problem.

10. The computer-implemented method of claim 1, wherein the decision tree is trained to solve a classification problem.

11. The computer-implemented method of claim 1, wherein the training set includes imbalanced datasets and a model accuracy performance measurement includes nonlinear metrics.

12. A computer program product comprising a computer readable storage medium having program instructions embodied therewith, the program instructions readable by a device to cause the device to:

receive a training set;

initialize the decision tree by constructing a root node and training a root solver with the training set;

grow the decision tree by iteratively splitting nodes of the decision tree, wherein at a node of the decision tree, dimension reduction is performed on features of data of the training set received at the node, and the data having reduced dimension is split based on optimizing a routing function, for routing to another node of the decision tree, wherein the dimension reduction and the split is performed together at the node, wherein the decision tree includes routing nodes and leaf nodes; and perform training for the routing functions at the routing nodes, solvers at the leaf nodes, and dimension reduction at each of the routing nodes and leaf nodes of the decision tree simultaneously by a unified optimization algorithm that combines the routing functions at the routing nodes, solvers at the leaf nodes, and dimension reduction at each of the routing nodes and leaf nodes of the decision tree, simultaneously training obtaining model parameters for the routing nodes and solvers for the leaf nodes, the dimension reduction being performed on a cluster of data sent to each of the routing nodes, wherein a first cluster sent to a first routing node of the routing nodes has a different set of feature from a second cluster sent to a second routing node of the routing nodes, wherein, at each layer below the root node of the decision tree, a solver is assigned the trained root solver and at least two new solvers are trained with a random subset of the training set and fitted as the routing functions.

13. The computer program product of claim 12, wherein the nodes are iteratively split until a predetermined topology is obtained.

14. The computer program product of claim 12, the leaf nodes of the decision tree include the solvers that return a predicted target value.

15. The computer program product of claim 12, wherein the leaf nodes of the decision tree include a regression model that returns a predicted target value.

16. The computer program product of claim 12, wherein the device is further caused to optimize the decision tree using a regularizer.

17. The computer program product of claim 16 wherein the regularizer includes at least one of an orthogonality regularizer, a diversification regularizer and a single routing regularizer.

18. A system comprising:

a processor; and a memory device coupled with the processor, the processor configured to at least:

receive a training set;

initialize the decision tree by constructing a root node and training a root solver with the training set;

grow the decision tree by iteratively splitting nodes of the decision tree, wherein at a node of the decision tree, dimension reduction is performed on features of data of the training set received at the node, and the data having reduced dimension is split based on optimizing a routing function, for routing to another node of the decision tree, wherein the dimension reduction and the split is performed together at the node, wherein the decision tree includes routing nodes and leaf nodes;

perform training for routing functions at the routing nodes, solvers at the leaf nodes, and dimension reduction at each of the routing nodes and leaf nodes of the decision tree simultaneously by a unified optimization algorithm that combines the routing functions at the routing nodes, solvers at the leaf nodes, and dimension reduction at each of the routing nodes and leaf nodes of the decision tree, simultaneously training obtaining model parameters for the routing nodes and solvers for the leaf nodes, the dimension reduction being performed on a cluster of data sent to each of the routing nodes, wherein a first cluster sent to a first routing node of the routing nodes has a different set of feature from a second cluster sent to a second routing node of the routing nodes, wherein, at each layer below the root node of the decision tree, a solver is assigned the trained root solver and at least two new solvers are trained with a random subset of the training set and fitted as the routing functions.

19. The system of claim 18, wherein the leaf nodes of the decision tree include a regression model that returns a predicted target value.

20. The method of claim 1, further including preprocessing the training set by at least standardizing the features of data of the training set, and applying a principal component analysis to the training set.

* * * * *